UNITED STATES PATENT OFFICE.

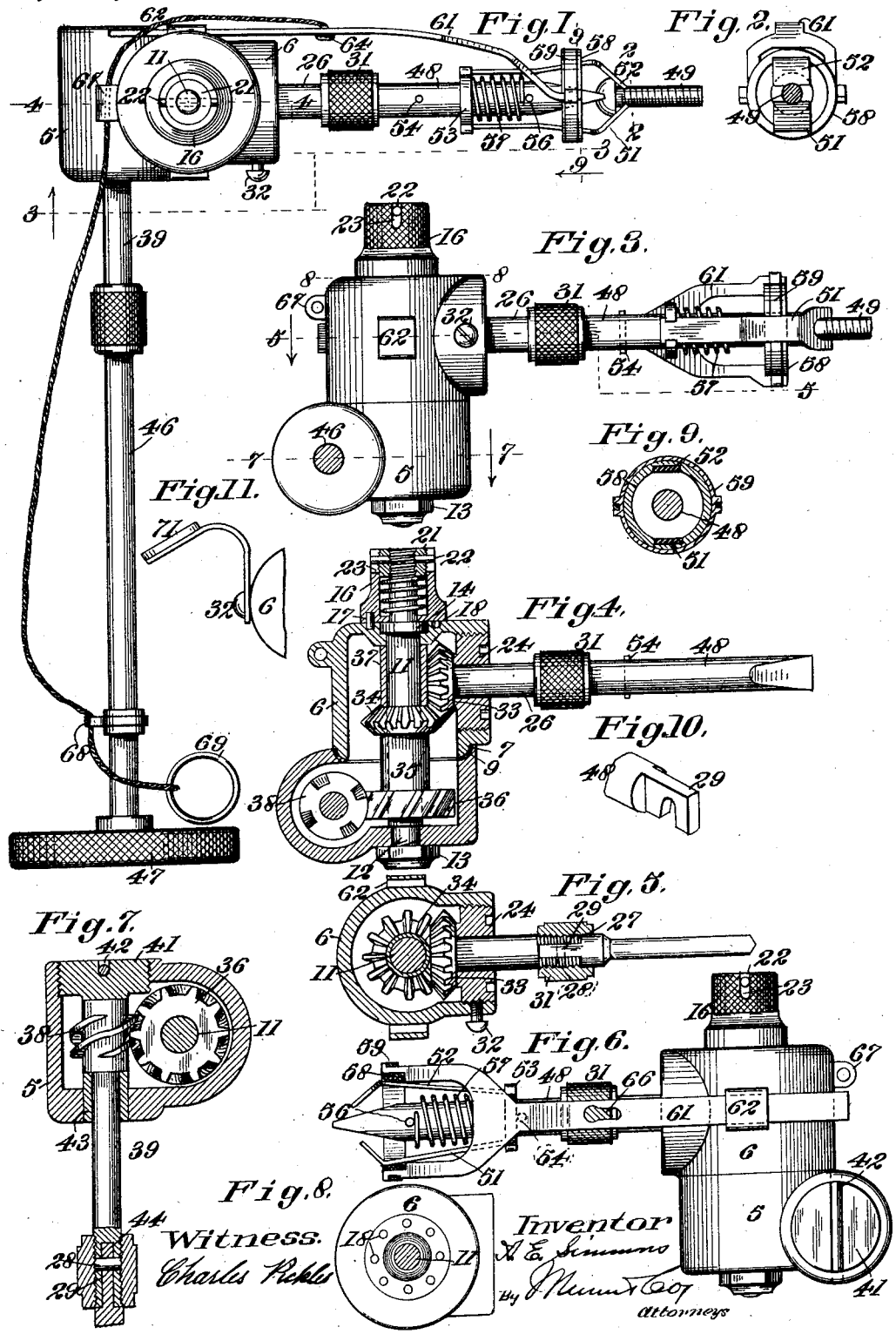

ALBERT E. SIMMONS, OF EUREKA, CALIFORNIA.

SCREW DRIVER.

1,405,723.

Specification of Letters Patent.  Patented Feb. 7, 1922.

Application filed August 21, 1920. Serial No. 405,045.

*To all whom it may concern:*

Be it known that I, ALBERT E. SIMMONS, a citizen of the United States, and resident of Eureka, in the State of California, have invented a new and useful Improvement in Screw Drivers, of which the following is a specification.

The present invention relates to an improvement in screw drivers and has to do in particular what that type of screw driver which is capable of being adjusted so as to operate at various angles and in places which are inaccessible to the ordinary screw driver.

It is a well known fact that in various trades, arts and crafts many times it is necessary to place a screw in a location which is inaccessible to the ordinary screw driver, the orizinal screw having been placed before the assembling of a machine, and it is to obviate the necessity of the dis-assembling of a machine in order to replace a screw that I have devised the screw driver to be hereinafter described.

The principal object of this invention is to produce a screw driver, the driving means of which may be so adjusted as to operate through various angles so that inaccessible places may be reached.

Other objects and advantages will be seen as the description proceeds.

I do not wish to confine this invention to the particular type of screw-driver as disclosed herein, as the same may be embodied in other forms without departing from the spirit of the invention.

In the drawings, Figure 1 is a side elevation of my screw-driver, showing a screw in position on the end thereof.

Figure 2 is a cross-section taken on the line 2—2 of Figure 1.

Figure 3 is a cross section taken on the line 3—3 of Figure 1.

Figure 4 is a cross section taken on the line 4—4, Figure 1.

Figure 5 is a cross section taken on the line 5—5 of Figure 3.

Figure 6 is a top plan view of Figure 1.

Figure 7 is a cross section taken on the line 7—7 of Figure 3.

Figure 8 is a cross section taken on the line 8—8 of Figure 3.

Figure 9 is a cross section taken on the line 9—9 of Figure 1.

Figure 10 is a fragmentary perspective view of a connecting means.

Figure 11 is a fragmentary detail view of a mirror attachment.

Referring to the drawings in detail, the numerals 5 and 6 refer to castings which house the gear arrangement of my screw driver, the casting 5 having a concave surface 7 which is adapted to fit the convex surface 8. A felt washer 9 is inserted between these surfaces 7 and 8 to prevent leakage of grease in the interior of these castings as will be later set forth.

These castings are held together by a pivot shaft 11 which is screw-threaded into the casting 5 as shown at 12. In order to prevent this shaft 11 from unscrewing, I provide a lock washer 13. This shaft 11 is provided with a shoulder 14, which shoulder rests within an annular recess formed within the casting 6 and serves to hold the casting 6 in contact with the casting 5.

To prevent rotation of one casting upon the other I provide a spring held member 16 which has a pin 17 secured therein. This pin 17 is adapted to enter one of the openings 18 formed in the end of the casting 6.

A spring 19 is positioned within an annular recess in the member 16 and has one end bearing against a shoulder 20, and has its opposite end bearing against a nut 21 secured upon the end of the shaft 11.

A pin 22 passes through the nut 21 and shaft 11 and has its extremities positioned within slots 23 formed in the end of the member 16. With this arrangement, by lifting the member 16 so as to withdraw the pin 17 from its opening 19, the casting 6 may be rotated upon the casting 5 about the shaft 11 and adjusted to any desired angle, after which the member 16 and pin 17 are again allowed to engage the same thereby locking the casting to the shaft 11.

The casting 6 is provided with an orifice closed by a screw threaded plug 24, through which a shaft 26 passes. This shaft 26 is bifurcated as shown at 27, Figure 5, and also screw-threaded, as shown at 28. A pin 29 connects the bifurcated ends and also serves to retain the end of a screw driver or like tool, which end is formed as shown in Figure 10. These parts are secured against separation through the medium of a knurled nut 31.

The screw plug 24 is prevented from rotation and accidental removal through the medium of a set-screw 32, which also serves another purpose, to be later described. The end of the shaft 26 carries a bevel-gear 33 meshing with a bevel-gear 34 mounted upon a sleeve 35 on shaft 11 carrying a worm-gear 36. A spacer 37 is positioned upon the shaft 11 and also serves as a thrust member for the gear 33.

In order to rotate the gears thus far described, I provide a worm 38 mounted upon the end of a shaft 39 and positioned within the casting 5 as best shown in Figures 4 and 7.

A screw-threaded plug 41 is secured against rotation within the casting 5 by a pin 42 and acts as a thrust block for the end of the worm 38 and a bushing 43 acts as a thrust block when the worm is operated in the opposite direction.

The shaft 39 is bifurcated as shown at 44, and a joint similar to that above described serves to connect a shaft 46 to which a hand-wheel 47 is attached.

By referring to Figure 1, it will be noted that the numeral 48 refers to a bit such as is used for driving screws, and is here shown with a screw 49 held in contact therewith by spring jaws 51 and 52, which jaws have their ends connected to a yoke 53 surrounding the bit 48. Forward movement of this yoke is prevented by a pin 56 against which a spring 57 contacts.

The numeral 58 designates a circular member surrounding the spring-jaws, as best shown in Figures 2 and 9. This circular member is preferably recessed so as to position a superimposed ring 59, which ring is adapted to allow the member 58 to be rotated with the jaws 51 and 52. At 61 I have shown a sliding member which is adapted to engage the ring 59 and has its free end extending through an eye 62 formed upon the casting 6. Movement of this slide 61 is accomplished through a cable 63 having a knot 64, which knot is introduced through the bayonet slot 66 in the member 61. This cable 63 is preferably carried around the casting 6, through a guide 67 and has its free end passing through a guide 68 carried upon the shaft 46 at a point near the knurled handle 47. A finger ring 69 may be attached to the same for the purpose of easier operation.

Operation.

Assuming that it is desired to place a screw at right angles to the operator, the screw-driver is adjusted so that the castings 5 and 6 take a position which will be similar to that disclosed in Figure 1. This is accomplished by raising the member 16 and turning the castings until the driving and driven elements are at an angle of 90 degrees.

Now, assuming that it is desired to turn a screw into an opening provided for it, the screw is brought in contact with the bit so that the slot of the screw is engaged by the same. The yoke 53 is then pushed forward until the jaws 51 and 52 grip the screw at a point beyond its head, whereupon the spring 57 will draw the screw into firmer engagement with the bit. The slide 61 is pressed forward whereby the grip of the jaws on the screw is tightened, and the screw can then conveniently be handled by means of the brace and inserted into its opening.

By operating the handle 47, the bit 48 will be caused to rotate, which in turn will rotate the screw 49 and cause the same to engage its thread. Should the work be out of the range of vision of the operator, a mirror, as shown at 71 Figure 11, may be attached to the screw 32 so as to reflect the screw 49.

After the engagement has been completed and the screw is upon its way the cable 63 may be pulled, which will cause the circular member 58 to move rearwardly, thus disengaging the jaws 51 and 52 from the screw. As soon as they are disengaged, the spring 57 will move the same rearwardly and out of the path which the head of the screw is to take.

Should it be desired to move the slide 61 to the opposite side of the device, the same may be accomplished by reversal of parts so that the slide will engage the eye upon the underside of the device.

Should it be desired to use other tools with my screw driver, the knurled member 31 may be loosened, and the bit may be removed, together with its screw-holding members, and any other tool may be inserted in place thereof.

If it is desired to connect motive power, a similar connection may be made in place of the shaft 46.

Having described my invention, what I claim is:

In a screw driver, a casting, a shaft rotatably supported in the same, the casting being transversely divided so that either portion is capable of independent rotary motion on the shaft, a sleeve slidably but not rotatably secured on the shaft having means for selectively engaging one of the said portions in different positions so as to lock the same to the shaft, a screw engaging shaft supported in said portion at right angles to the first shaft adapted to receive rotary motion from the same, and a driving shaft supported in the other portion in a plane parallel to that of the second shaft and driving the screw engaging shaft through gears rotating on the first shaft.

ALBERT E. SIMMONS.